United States Patent [19]

Auracher et al.

[11] Patent Number: 5,209,205
[45] Date of Patent: May 11, 1993

[54] METHOD AND APPARATUS FOR INJECTING FUEL INTO THE CYLINDERS OF AN ENGINE HAVING AN INJECTION INPUT VALVE FOR EACH CYLINDER

[75] Inventors: Gerd Auracher, Beilstein; Joerg Lange, Eberdingen-Hochdorf; Winfried Moser, Ludwigsburg, all of Fed. Rep. of Germany

[73] Assignee: Robert Bosch GmbH, Stuttgart, Fed. Rep. of Germany

[21] Appl. No.: 893,323

[22] Filed: Jun. 3, 1992

[30] Foreign Application Priority Data

Jun. 28, 1991 [DE] Fed. Rep. of Germany ....... 4121396

[51] Int. Cl.$^5$ ............................................. F02M 51/00
[52] U.S. Cl. .................................................... 123/478
[58] Field of Search ................. 123/78, 480, 295, 305; 364/431.05

[56] References Cited

U.S. PATENT DOCUMENTS 4,915,078 4/1990 Sonoda et al. ...................... 123/78
4,955,339 9/1990 Sasaki et al. ........................ 123/295
5,068,794 11/1991 Itosoka ............................ 364/431.05

FOREIGN PATENT DOCUMENTS 3609798 10/1986 Fed. Rep. of Germany ...... 123/478

Primary Examiner—Raymond A. Nelli
Attorney, Agent, or Firm—Kenyon & Kenyon

[57] ABSTRACT

A method and apparatus for injecting fuel into the cylinders of an engine which has an injection valve for each cylinder that is positioned so that it can injection fuel into an open inlet port. The method and apparatus provide for fuel to be partially injected into a suction pipe leading to the cylinder before the corresponding intake-valve arrangement opens, so that it is stored in advance. Fuel is also partially injected into the open inlet port. A value which is a measure of the temperature in the suction pipe also is acquired. On the basis of this acquired value, the total required fuel quantity to be stored in advance is determined and to what extent this fuel quantity will be injected after the injection-valve arrangement opens. The method and apparatus avoid the formation of wall film in the suction pipe as a result of storing too much injected fuel in advance.

12 Claims, 3 Drawing Sheets

FIG. 2

METHOD AND APPARATUS FOR INJECTING FUEL INTO THE CYLINDERS OF AN ENGINE HAVING AN INJECTION INPUT VALVE FOR EACH CYLINDER

FIELD OF THE INVENTION

The present invention relates to a method and apparatus for injecting fuel into the cylinders of an engine. More specifically, the present invention is a method and apparatus for providing the timing of the injection intervals relative to the instant at which the intake-valve arrangement opens to a cylinder.

BACKGROUND OF THE INVENTION

In sequential injection, such as when an injection valve that is capable of being individually triggered is allocated to each cylinder, fuel usually is injected in a way that permits the actual total quantity of fuel required at any one time (total fuel quantity) to be ejected before the intake-valve arrangement opens for the particular cylinder. However, this causes condensation of fuel on the corresponding suction pipe and, thus, leads to a so-called wall film. In steady-state processes, this wall film does not have a disturbing effect. However, in non-steady processes, the wall film creates errors in the metering of fuel into a cylinder because fuel which should be available for combustion is either stored in the wall film or released from the wall film. Accordingly, the aspirated air is enriched with fuel to a greater degree than actually desired. To avoid these disadvantages, in a method described by German Printed Patent No. 36 09 798, the fuel is not stored in advance (i.e., is not ejected before the intake-valve arrangement opens), but rather is ejected only after it opens.

Other than the above-mentioned processes, in which the total fuel quantity is either completely stored in advance or completely injected into the valve opening, a considerable portion of the total fuel quantity may be injected so that it is stored in advance, with a residual quantity being ejected shortly before the intake-valve arrangement closes. In this manner, a particularly good ignitable mixture is attained in the upper part of the mixture that was aspirated.

Despite these various methods and devices for injecting fuel, the problem still exists with regard to finding a method and device which will allow the injected fuel to evaporate as optimally as possible while largely avoiding the formation of wall film.

SUMMARY OF THE INVENTION

The method according to the present invention is preferably for injecting fuel into the cylinders of an Otto (spark ignition) engine. This engine has an injection valve for each cylinder that is positioned so that it can inject fuel into an open inlet port.

The method provides for the acquisition of a value which is a measure of the temperature in a suction pipe. On the basis of the acquired value, it is determined to what extent the total required fuel quantity will be stored in advance and to what extent this fuel quantity will be injected after the injection-valve arrangement opens. The formation of wall film in the suction pipe as a result of storing too much injected fuel in advance is largely avoided. Yet, the fuel evaporates in the warm suction pipe as optimally as possible.

The apparatus according to the present invention for injecting fuel includes a device for acquiring the above-mentioned value and a device for determining the time of injection and making the above-mentioned determination.

The method and apparatus according to the present invention take advantage of the fact that no wall film is formed on a hot suction pipe even when there is a relatively large amount of injected fuel, but rather that the fuel evaporates very well due to the high temperatures. Therefore, in this case, it is worthwhile to store the fuel before injecting it On the other hand, if the suction pipe is cold, even a very small quantity of fuel will be sufficient to form a wall film. This is why it is more advantageous in this case to inject the fuel into the open inlet port.

According to an embodiment of the present invention, the entire quantity of fuel is either injected so that it is stored in advance and can be completely evaporated, or it is injected into the open inlet port.

According to another embodiment of the present invention, which is more advantageous for preparing the mixture, as much fuel as possible is ejected so that it is stored in advance dependent upon the actual suction-pipe temperature at the time. This maximum amount of fuel which can be ejected so that it is stored in advance is the quantity of fuel that can evaporate without the formation of any significant wall film. Only the residue, if any remains, is injected into the open inlet port. This embodiment is based on the assumption that preparing the mixture by evaporating it in the suction pipe is always better than preparing the mixture by atomizing it upon injection into the open inlet port. In this embodiment with subdivided fuel quantities, however, it must be ensured that the fuel quantities do not become smaller than the minimum quantity that an injection valve can eject with a reliable dosage rate.

With a very small total quantity of fuel and a cold suction pipe, a subdivision may no longer be permissible in that the minimum quantity would not otherwise be met for at least one of the two parts. In this case, the total fuel quantity is injected into the open inlet port. This procedure is based on the fact, particularly at low loads and low rotational speeds, that the engine is especially critical with respect to non-steady processes. As a result, avoiding wall film takes priority over possibly improving evaporation of a partial quantity of fuel by storing the same in advance.

When the two partial fuel quantities are determined, the problem still exists in establishing the beginning of injection and the end of injection For this purpose, any known technique may be applied. Typically, the end of injection is specified and, with the help of the duration of injection, the beginning of injection is calculated. The beginning of injection will be an angular position of a crankshaft which is detected by a crankshaft-angular-position sensor. Preferably, the instant at which the injection-valve arrangement opens is established essentially as the end of injection for the fuel quantity to be stored in advance. This may be done in any well-known manner, i.e., usual factors which shift the end of injection to slightly before the opening instant of the intake-valve arrangement are still considered. One of these factors is the time between the instant that fuel is ejected and the instant that it strikes against the hot wall of the suction pipe.

Preferably, the instant at which the intake arrangement closes is selected essentially as the end of injection for the quantity of fuel injected through the open inlet port. If the injection time period is longer than the difference between the instants that the intake arrangement opens and closes, the fuel quantity that is actually supposed to be ejected into the open inlet port must begin to be ejected before this arrangement opens, so that a portion of the fuel has to be stored in advance in an undesirable manner. This is necessary, however, to guarantee that the particular cylinder receives the entire quantity of fuel allocated to it. In this case, the end of injection for the fuel quantity to be stored in advance, if such a quantity is supposed to be ejected, must be moved forward until it coincides with the beginning of the injection time period for the fuel which was supposed to have been injected into the open inlet port.

The above-mentioned, relatively late instants for the end of injection are selected so as to allow changes in the metering of air into a cylinder for as long as possible. However, this does not have to be taken into consideration for a motor vehicle that has a so-called electronic gas pedal. In that case, the fuel can begin to be stored in advance as soon as the intake-valve arrangement is closed. If this is a large quantity of fuel and the driver lets up on the gas pedal after the fuel is metered in, the electronic gas pedal prevents the throttle valve from closing until the already-ejected, large quantity of fuel receives the corresponding, large metered-in air volume. Only then does the throttle valve follow the movement of the gas pedal. Given such an electronic gas pedal, when the principles according to the present invention are applied, the fuel quantity to be stored in advance is ejected as soon as possible. The fuel quantity can be greater than it would be for the same engine without an electronic gas pedal, because more time is available for evaporation.

With respect to the end instant of injection into the open inlet port, the above-mentioned obligation to establish the end of injection at the latest possible instant also does not exist when there is no electronic gas pedal. To the contrary, it is advantageous to establish the end of injection so that the beginning of injection essentially coincides with the opening of the intake-valve arrangement. The injected fuel is then mixed with the air flowing-in and has the longest possible time available for evaporation. However, this type of procedure requires a relatively large number of additional computationals.

It would be the most advantageous for the method according to the present invention to measure the suction-pipe temperature directly as a measure for the temperature prevailing in the suction pipe. However, because in practice it is generally too costly to mount a temperature sensor on each suction pipe, it is recommended to acquire another value as a measure for this temperature, in particular the engine temperature. However, the suction-pipe temperature can also be estimated with the help of a warm-flow model, in particular based on the engine temperature. However, the extra computational word required for this is considerable.

If an expert system establishes the engine temperature, for example, as a variable whose value is acquired in order to provide a measure for the temperature prevailing in the suction pipe, a table on a test stand can be set up for testing engines. The table reveals at what engine temperature which fuel quantities can be stored before being injected without an undesirably thick wall film appearing. The thickness of the wall film can be determined in the usual manner with the help of non-steady processes. That is, if the engine is running on the test stand in a non-steady state at any one time with a fuel quantity that should yield a lambda value of one, but deviations from this lambda ($\lambda$) value occur in the exhaust gas, this indicates that the amount of wall film has increased or decreased. The fluctuations in the lambda ($\lambda$) value to be tolerated can be established, and the fuel quantity that is stored in advance can be determined so that the fluctuations remain within the required limits. Then, if during the actual operation of the engine, a total fuel quantity results which is greater than the fuel quantity determined in this manner, then at least the differential quantity must be injected into the open inlet port.

DETAILED DESCRIPTION OF THE INVENTION

Figure 1:
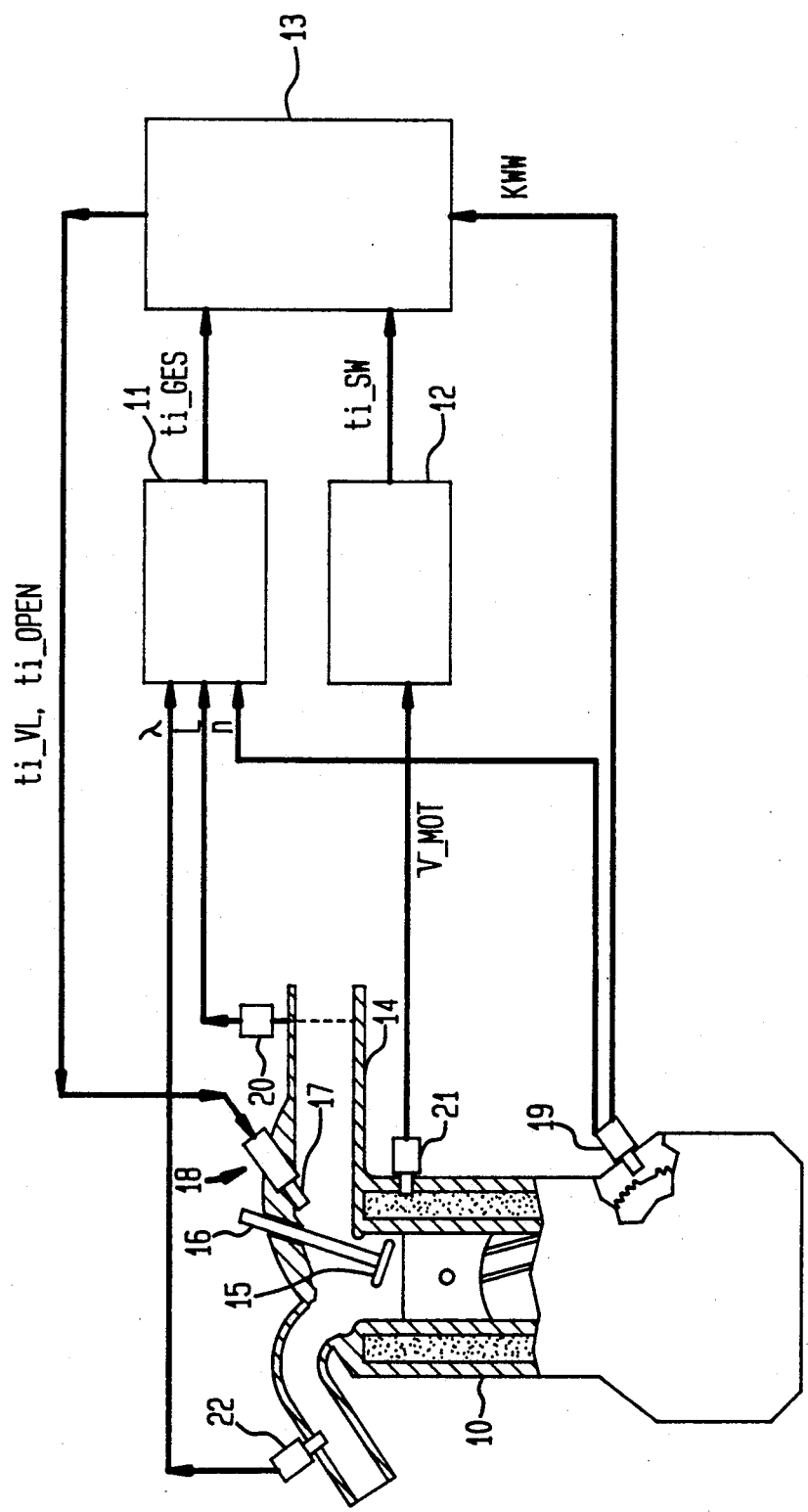
FIG. 1 shows a block diagram of an internal combustion engine that includes a device for calculating a total-injection time, a device for calculating a threshold-value injection-time table, and a device for determining the time of injection.

FIG. 1 shows an internal combustion engine 10 that includes a device 11 for calculating a total injection time, a device 12 for calculating a threshold-value injection-time table, and a device 13 for determining a time of injection. At its end that opens out into a cylinder, a suction pipe 14 has an inlet port that has opened because an intake valve 16 has lifted from its seat. An injection nozzle 17 of an injection valve 18 discharges fuel into the suction pipe 14 to allow fuel to be injected into the open inlet port. The ejected fuel is carried into the inlet port by the air flowing through the suction pipe. If the intake valve 16 is closed, the fuel ejected as fine mist is not carried by the flowing air, but rather is spread out in the suction pipe 14. When the suction pipe is cold again, fuel droplets precipitate directly on the pipe, and a portion of the fuel vapor present in the suction-pipe volume condenses on the cold wall. In this manner, a wall film is formed. If, on the other hand, the suction pipe is very hot, fuel droplets striking against this wall evaporate. Because the smallest possible droplets are obtained during the ejection, which is particularly advantageous during the injection into the open intake valve, the nozzle 17 of the intake valve 18 is designed accordingly.

To enable the overall device to calculate the total injection time ti_GES for the injection valve 17 of a specific cylinder, which time corresponds to the actual operating state of the engine 10 at the time, the device receives a rotational-speed signal n from a speed sensor 19, a load signal L from an air-mass sensor 20, an engine-temperature signal v_MOT from an engine-temperature sensor 21, and a lambda-value ($\lambda$) signal from a lambda probe 22. In the usual manner, the device 11 for calculating the total injection time contains a pilot-control performance graph for injection times, a setpoint-value performance graph for lambda values, and a lambda controller. These details are not shown in FIG. 1.

The threshold-value injection-time table 12 stores setpoint values for injection times ti_SW dependent upon the engine temperature v_MOT. The setpoint values relate to injection times for fuel that is stored before it is ejected. The times are applied on a test stand for a particular engine in such a way that, in case of non-steady processes, deviations from an actually desired lambda (λ) value occur only within specified limits. This means that the λ values are applied in a way that essentially prevents wall film from building-up as a result of fuel being stored before it is injected. As the engine temperature v_MOT, and thus also the temperature of the suction pipe 20, increase the corresponding injection-time threshold value ti_SW contained in table 12 also increases.

Figure 2:
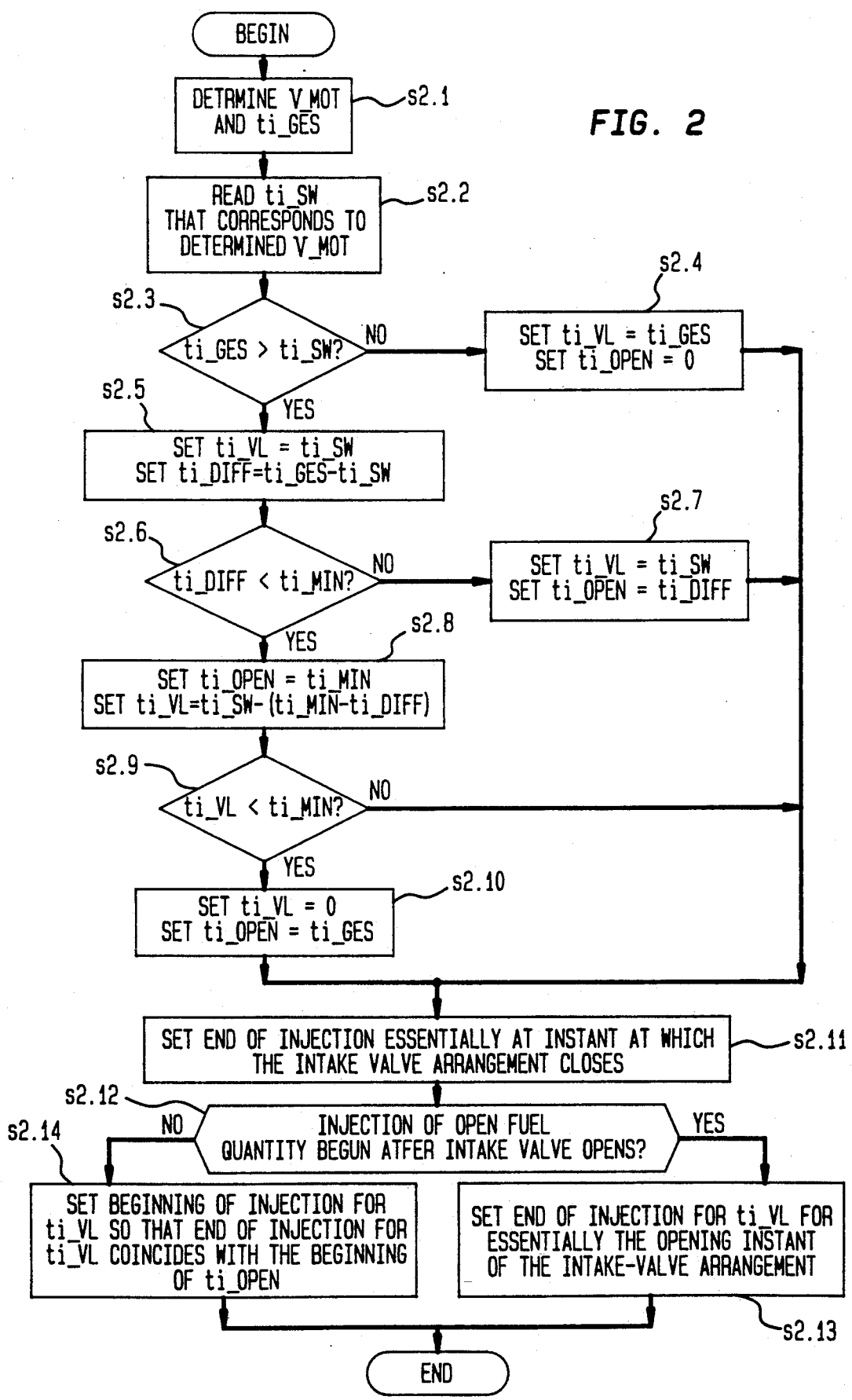
FIG. 2 shows a flow chart illustrating an injection method according to the present invention in which a total fuel quantity is subdivided into an advanced storage quantity and an open quantity based upon a suction-pipe temperature.
Figure 3:
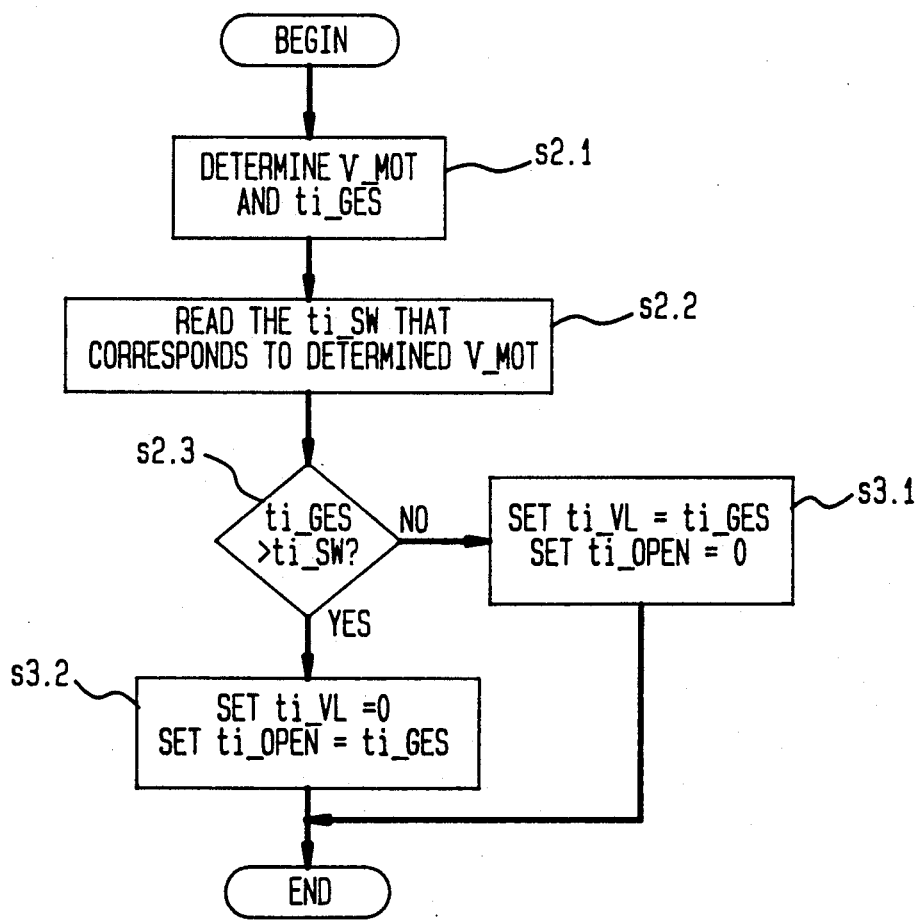
FIG. 3 shows a flow chart illustrating an injection method according to the present invention in which a total fuel quantity is either entirely stored in advance or is entirely injected into an open inlet port based upon a suction-pipe temperature.

On the basis of the total injection time ti GES, which establishes the total fuel quantity, and the threshold-value injection time ti_SW, which indicates the maximum quantity of fuel to be stored in advance, the device 13 for determining the time of injection calculates the injection time ti_VL and the open-injection time ti_OFFEN, which indicates the quantity of fuel to be stored in advance, or the open quantity, that is, that fuel quantity which is injected when the intake valve 16 is open and the aspirated air current is directly into the inlet port 15 that is illustrated in FIG. 2 or 3. The device 13 for determining the time of injection not only calculates the time periods, but also establishes the beginning and the end of a specific injection. For this purpose, it receives a crankshaft-angular-position signal KWW from the speed sensor 19.

The method according to the present invention that is illustrated in FIG. 2 or FIG. 3 is performed for each individual injection.

In a step s2.1, the engine temperature v MOT and the total time of injection ti_GES are determined. Based upon the engine temperature, the corresponding threshold-value injection time ti_SW is read from the threshold-value injection-time table 12 (step s2.2). By comparing the total injection time ti_GES the threshold-value injection time ti_SW (step s2.3), the system checks whether the former time is greater than the latter time. If not, it is clear that the entire fuel quantity can be stored in advance and, accordingly, no fuel has to be injected into the open valve opening (step s2.4). Otherwise, it is initially assumed that the difference (step s2.5) between the total fuel quantity and the threshold-value fuel quantity must be injected into the open valve opening.

However, the result of the subtraction, as checked in a step s2.6, can be that the differential injection time ti_DIFF is less than the shortest-possible injection time ti_MIN, which allows only a reliably-dosed injection of fuel. In this case, the injection valves for a particular engine must be designed to enable the fuel quantity, which must be injected at the lowest rotational speed in no-load operation without additionally-driven aggregates, to just be reliably dosed.

If the differential injection time is not less than this minimum time, it is clear that the total threshold quantity can be stored in advance, and that the calculated differential quantity can be ejected into the open intake-valve opening (step s2.7). Otherwise, the injection time ti_OFFEN is increased to the value ti_MIN. Then, however, the advance-storage time period ti_VL must be shortened accordingly, in step s2.8 of FIG. 2.

When the advance-storage time period is reduced in this manner, the time period may become less than the minimum time span ti_MIN, as checked in step s2.9. If this is not the case, the injection can be performed with the time periods calculated in step s2.8. Otherwise, it follows from steps s2.6 and s2.9 that the total fuel quantity cannot be subdivided, because otherwise at least one of the two parts would be smaller than the amount of fuel that can be reliably injected.

Thus, the total fuel quantity must be ejected all at once and, in fact, either stored in advance or ejected into the open inlet port. It is more advantageous to select the second possibility (step s2.10), since the difficulty discussed above arises only when the loads and rotational speeds are low, such that the engine reacts very critically to non-steady processes. In such operating states, it is therefore very important to avoid the formation of wall film. This is the reason why the fuel is not stored before the injection.

When the injection time spans have been established in steps s2.1 to s2.10, the beginning and end instants must still be established, in steps s2.11 to s2.14. In step s2.11, the end of injection for ti_OFFEN is set essentially at the instant at which the intake-valve arrangement closes The two instants cannot coincide exactly, since the time for the fuel to travel from the injection nozzle 17 to the inlet port 15 must be allowed.

The corresponding beginning of injection is able to be calculated based upon the end and the duration of ti_OFFEN. Dependent upon the duration of ti_OFFEN and the amount of time between the opening and the closing of the valve 16, the beginning instant can lie before or after the opening of the intake valve 16. Step s2.12 examines the actual situation. If it turns out that the injection of the open fuel quantity is begun only after the intake valve opens, the end of injection for ti_VL is essentially set at the opening instant of the intake-valve arrangement, in this case, the one intake valve 16 per cylinder (step s2.13). Otherwise, the beginning of injection for ti_VL is set so that the end of injection for ti_VL coincides with the beginning of ti OFFEN (step s2.14).

The advantage of this method according to the present invention is that the maximum possible quantity of fuel, i.e., the maximum amount of fuel that does not lead to considerable wall film, can always be stored in advance. This fuel quantity that is stored in advance is optimally prepared, since it is essentially vaporous. A disadvantage, however, is that this method requires a great deal of extra computational work. A simpler method, which after steps s2.1 to s2.3 only requires only two further steps instead of the eleven further steps of FIG. 2, is now described with reference to FIG. 3.

In the flow chart of FIG. 3, the total fuel quantity is not subdivided, but instead is either completely stored in advance or completely ejected into the open inlet port. If in step s2.3 the total injection time ti_GES is not greater than the threshold-value injection time ti_SW, the advance-storage injection time is set equal to the total injection time, and the end of injection is set essentially to the instant at which the intake-valve arrangement opens (step s3.1). Otherwise, the open-injection time is set to the total-injection time, and the end of injection is fixed essentially at the closing instant of the intake valve arrangement (step s3.2).

The above embodiments of the present invention apply to the selection of the end of injection for a motor vehicle that does not have an electronic gas pedal. If the motor vehicle does have an electronic gas pedal, it is better to specify the beginning of injection In each case, the time instant coincides essentially with the closing of an intake-valve arrangement, so that the fuel is ejected at the earliest possible instant Consequently, the longest possible advance-storage time period is available.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

What is claimed is:

1. A method of injecting fuel into a cylinder of an engine, the engine having an intake-valve arrangement for moving between an open position and a closed position to control injection of fuel from a suction pipe of the engine into the cylinder, comprising the steps of:
   determining a temperature of the suction pipe;
   introducing a first portion of fuel into the suction pipe when the intake-valve arrangement is in the closed position; and
   introducing a second portion of fuel into the suction pipe when the intake-valve arrangement is in the open position, the first and second portions of fuel being dependent on the determined temperature.

2. The method as recited in claim 1, wherein the second portion is equal to zero when a sum of the first portion and the second portion is at least as low as a threshold quantity.

3. The method as recited in claim 2, wherein the method further comprises the step of determining a first difference value between the threshold quantity and the sum of the first and second portions when the sum is greater than the threshold quantity.

4. The method as recited in claim 3, further comprising the steps of:
   comparing the first difference value to a minimum quantity; and
   setting the first portion equal to the threshold quantity and the second portion equal to the first difference value when the first difference value is as least as high a the minimum quantity.

5. The method as recited in claim 4, wherein the method further comprises the steps of:
   subtracting the first difference value from the minimum quantity to obtain a second difference value when the first difference value is less than the minimum quantity;
   subtracting the second difference value from the threshold quantity to obtain the first portion; and
   setting the second portion equal to the minimum quantity.

6. The method as recited in claim 5, further comprising the steps of:
   comparing the first portion to the minimum quantity; and
   setting the first portion equal to zero when the first portion is less than the minimum quantity.

7. The method as recited in claim 6, wherein the first portion of fuel is introduced when the intake-value arrangement moves from the closed position to the open position.

8. The method as recited in claim 6, wherein the method further comprises the step of ejecting the differential quantity of fuel before an inlet port of the engine closes.

9. The method as recited in claim 1, wherein the method further comprises the steps of:
   determining a total fuel quantity to be injected into the cylinder;
   comparing the total fuel quantity to a threshold quantity;
   setting the first portion equal to the total fuel quantity if the total fuel quantity is greater than the threshold quantity; and
   setting the second portion equal to the total fuel quantity if the total fuel quantity is at least as low as the threshold quantity.

10. The method as recited in claim 9, wherein the method further comprises the step of ejecting the total quantity of fuel before an inlet port of the engine closes.

11. The method as recited in claim 1, wherein the temperature of the suction pipe is determined by measuring an engine temperature.

12. An apparatus for injecting fuel into a cylinder of an engine, the engine having an intake-valve arrangement for moving between an open position and a closed position to control injection of fuel from a suction pipe of the engine into the cylinder, comprising:
   means for determining a temperature of the suction pipe;
   an injection valve for introducing a first portion of fuel into the suction pipe when the intake-valve arrangement is in the closed position, and for introducing a second portion of fuel into the suction pipe when the intake-valve arrangement is in the open position; and
   means for determining the first and second portions of fuel based upon the determined temperature.

* * * * *